Patented Aug. 21, 1945

2,383,084

UNITED STATES PATENT OFFICE 2,383,084

TERPENE RESINS

Alfred L. Rummelsburg, Wilmington, Del., assignor to Hercules Powder Company, Wilmington, Del., a corporation of Delaware No Drawing. Application April 6, 1942, Serial No. 437,841

15 Claims. (Cl. 260—86)

This invention relates to the copolymerization products of acyclic terpenes having three double bonds per molecule and unsaturated aromatic compounds, and to the methods for their production.

In accordance with this invention, it has been found that acyclic terpenes having three double bonds per molecule may be copolymerized with various unsaturated aromatic compounds in the presence of a suitable catalyst and under suitable operating conditions to yield resinous materials having strikingly different characteristics than resinous terpene polymers. These new copolymers are distinguished in their possessing generally higher viscosities or melting points, as the case may be, than the corresponding polymers of terpenes or terpene mixtures. Thus, it is possible by proceeding in accordance with this invention to obtain products which are viscous liquids or solids having melting points as determined by the Hercules drop method of from about 20° C. to about 160° C., preferably between about 50° C. and about 160° C.

One of the constituents of the mixture submitted to polymerizing conditions will comprise an unsaturated aromatic compound. Such an unsaturated aromatic compound will be one having an unsaturated aliphatic substituent attached to the aromatic nucleus. These unsaturated aliphatic substituents may be of a chain nature in which the chain is attached to the aromatic nucleus at one point as in styrene, or of a cyclic nature with the aliphatic substituent attached to the aromatic nucleus at more than one place as in coumarone and indene. Otherwise stated, there may be employed any aromatic compound containing either a vinyl or vinylene group outside the aromatic nucleus. The unsaturated aliphatic substituents will, in accordance with this invention, contain not more than 5 carbon atoms. For example, there may be employed vinyl benzene (styrene); alkyl-substituted vinyl benzenes, such as, ortho-methyl vinyl benzene, meta-methyl vinyl benzene, para-methyl vinyl benzene, ortho-ethyl vinyl benzene, meta-ethyl vinyl benzene, para-ethyl vinyl benzene, ortho-propyl vinyl benzene, meta-propyl vinyl benzene, para-propyl vinyl benzene, alpha-ethyl vinyl benzene, beta-ethyl vinyl benzene, alpha-propyl vinyl benzene, beta-propyl vinyl benzene, etc.; divinyl benzene; propenyl benzene; alkyl-substituted propenyl benzenes, such as, ortho-methyl propenyl benzene, meta-methyl propenyl benzene, para-methyl propenyl benzene, ortho-ethyl propenyl benzene, meta-ethyl propenyl benzene, para-ethyl propenyl benzene, alpha-methyl propenyl benzene, beta-methyl propenyl benzene, etc.; isopropenyl benzene; alkyl-substituted isopropenyl benzenes, such as, ortho-methyl isopropenyl benzene, meta-methyl isopropenyl benzene, para-methyl isopropenyl benzene, ortho-ethyl isopropenyl benzene, meta-ethyl isopropenyl benzene, para-ethyl isopropenyl benzene, etc.; allyl benzene; alkyl-substituted allyl benzenes, such as, ortho-methyl allyl benzene, meta-methyl allyl benzene, para-methyl allyl benzene, alpha-methyl allyl benzene, etc.; crotyl benzene; alkyl-substituted crotyl benzenes, such as, ortho-methyl crotyl benzene, meta-methyl crotyl benzene, para-methyl crotyl benzene, alpha-methyl crotyl benzene, beta-methyl crotyl benzene, etc.; asymmetrical diphenyl ethylene; indene, etc. Oxygen-containing unsaturated aromatic compounds, such as coumarone, anethol, methyl chavicol, estragol, etc., may be employed. In addition, the halogen substitution products of the aforesaid compounds may, if desired, be employed. While benzene has been used as the aromatic nucleus in the aforementioned examples, similarly substituted aromatic substances may be used such as alkyl derivatives of toluene, xylene, etc.; aryl halides such as chlorobenzene, bromobenzene, chlorotoluene, bromotoluene and the like; and oxygenated derivatives of benzene, toluene, xylene and the like. Various mixtures of the aforesaid unsaturated aromatic compounds may be employed, as "Solvent naphtha."

The other constituent of the mixture submitted to conditions of polymerization will be an acyclic terpene having three double bonds per molecule, as myrcene, ocimene, allo-ocimene, cryptotaenene. Allo-ocimene is, in many cases, the preferred constituent inasmuch as in addition to having three double bonds per molecule, it has them in a triply conjugated arrangement. For convenience, an acyclic terpene having three double bonds per molecule will be referred to merely as an acyclic terpene. In place of pure acyclic terpenes or their synthetic mixtures, it is possible to employ materials rich in acyclic terpenes. For example, the pyrolysis of α-pinene yields mixtures containing as much as 40% allo-ocimene in conjunction with substantial quantities of α-pinene, dipentene, and other complex terpenes. The pyrolysis of β-pinene yields up to 65 to 70% myrcene in conjunction with small amounts of l-limonene, etc.

In accordance with the present invention, a mixture of an acyclic terpene and an unsaturated aromatic compound, desirably in the presence of an inert solvent, is contacted with a polymerization catalyst at a temperature which promotes copolymerization of the constituents for a period sufficiently long to secure a substantial yield of copolymerized product. Desirably, the reaction mixture will be vigorously agitated throughout the period of contact of the reactants with the catalyst.

The polymerization catalysts which will be employed in accordance with this invention can be categorized into four distinct groups. These groups comprise the metal halides, such as, boron trifluoride and its molecular complexes with ethers, acids, and salts, titanium chloride, ferric chloride, and the halides of metals whose hydroxides are amphoteric, as aluminum chloride, stannic chloride, zinc chloride, etc., and their complexes with salts such as NaCl, acids, such as, hydrofluoric acid, fluoboric acid, polybasic mineral acids, as orthophosphoric acid, tetraphosphoric acid, sulfuric acid, etc., acyl sulfuric acids, as acetyl sulfuric acid, alkyl sulfuric acids, as ethyl sulfuric acid, para-toluene sulfonic acid, etc.; activated clays, such as, fuller's earth, diatomaceous earth, alumina, bauxite, synthetic magnesium silicates, etc.; peroxide catalysts, such as, benzoyl peroxide, acetyl peroxide, etc. The metal halides are the preferred catalysts, in particular aluminum chloride. The activated clays will desirably be calcined at temperatures of, for example, from 100° C. to 500° C. prior to use. The peroxide catalysts disclosed above, in general, will be employed only where the unsaturated aromatic constituents are vinyl benzene and/or divinyl benzene.

Generally, the catalysts to reactant ratio will vary between about 0.001 and about 1.0. The operable temperature will vary from about −60° C. to about 200° C., and the operable reaction period will vary from about 1 hour to about 400 hours. Moreover, it is preferred when a metal halide or acid catalyst is employed, to use a catalyst to reactant ratio between about 0.02 and about 0.25, a reaction temperature between about −20° C. and about 80° C., and a reaction period between about 2 hours and about 24 hours. When an activated clay is employed as catalyst, it is preferred to use a catalyst to reactant ratio between about 0.05 and about 0.25, a reaction temperature between about 80° C. and about 200° C., and a reaction period between about 6 and about 8 hours. When a peroxide catalyst is used, it is preferred to employ a catalyst to reactant ratio between about 0.001 and about 0.01, a reaction temperature between about 50° C. and about 150° C. and a reaction period between about 48 and about 400 hours.

Generally, the acyclic terpene will be employed in an amount between about 5% and about 95% of the total weight of the reactants, with the unsaturated aromatic compound being employed in a corresponding amount of between about 5% and about 95% of the total weight of the reactants. As the proportion of unsaturated aromatic compound is increased, the resulting copolymers tend to have higher melting points and also show a decreasing solubility in drying and semi-drying oils. In general, and depending also upon the reaction conditions, where the ratio of acyclic terpene to unsaturated aromatic compound is 0.5 or greater, copolymers result which are soluble in drying and semi-drying oils. The resulting copolymers are also generally soluble in petroleum hydrocarbons. The ratio of acyclic terpene to unsaturated aromatic compound will also influence the type of catalyst required for the production of solid products. With the higher ratios, the metal halides or hydrofluoric acid will be required in order to obtain solid products.

The inert solvents which may be employed in accordance with this invention generally comprise any organic liquid which is inert to the reactants and catalyst employed. Thus, aliphatic hydrocarbons, such as, gasoline, petroleum naphtha, butane, pentane, etc.; aromatic hydrocarbons, such as, benzene, toluene, xylene, etc.; cyclic hydrocarbons, such as, cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, etc. In conjunction with the use of metal halide catalysts, the halogenated hydrocarbon and the aromatic hydrocarbon solvents are preferred, with the halogenated hydrocarbon solvents, such as, ethyl chloride, and ethylene dichloride, being most preferred. The ester solvents are the least preferred.

Following the reaction period, the reaction mixture is suitably treated to recover the copolymerized product as determined by the particular procedure employed in accomplishing the reaction. Thus, when a metal halide or acid catalyst has been employed, the catalyst may be removed by washing the reaction mixture with water or an aqueous alkali or an aqueous acid. The aqueous acid wash facilitates the removal of metal halide catalysts inasmuch as it decomposes catalyst-copolymer complexes. Following the alkali or acid washes, it is desirable to wash with water to remove all traces of alkali or acid. To remove any remaininng traces of metal halide catalyst or catalyst-copolymer complexes, the reaction mixture may be treated with an adsorbent, such as fuller's earth, silica gel, bauxite, activated carbon, etc. Finally, the solvent, if one has been employed, and any unreacted constituents are removed, preferably by means of steam or vacuum distillation using, if necessary, a final bath temperature between about 200 and about 220° C. An alternative method of recovering the copolymer after removal of the catalyst is to dilute the reaction mixture with an organic liquid which is miscible with the inert solvent employed but in which the copolymer is insoluble.

The color of the resinous copolymers may be improved by utilizing acyclic terpenes distilled from caustic. Also, the use of an inert atmosphere, such as $CO_2$, $N_2$, etc., during the reaction period leads to the production of pale-colored products. Further refinement of the products may be accomplished by treatment with the adsorbents hereinbefore mentioned, with selective solvents, such as, furfural, furfuryl alcohol, phenol, etc. In addition, the copolymers may be bleached by heat treatment at 275° C. to 325° C. for from 5 minutes to 30 minutes, desirably in an inert atmosphere. If desired, the copolymer resins obtained as described may be vacuum distilled to remove the lower copolymers to yield resins having higher melting points.

There follow several specific examples which illustrate particular embodiments of the principles of this invention which, however, are in no way to be construed as being limited. All parts and percentages are by weight unless otherwise indicated.

Example 1

Forty parts 98% allo-ocimene, 40 parts styrene, and 0.3 part benzoyl peroxide were heated for a period of 120 hours at about 140° C. After cooling, the product consisted of a solid resin having a color of K on the rosin scale, and a drop melting point of 94° C. The resin had a distinct improvement in flexibility in comparison with previously prepared liquid and solid terpene polymers disclosed in the prior art.

Example 2

Example 1 was duplicated replacing the allo-ocimene by 95% myrcene. The mixture was heated for a period of 140 hours at about 140° C. After cooling, the product consisted of a solid resin having a color of I on the rosin scale, and a drop melting point of 105° C. The physical characteristics of the resin were similar to those in Example 1.

Example 3

A mixture consisting of 75 parts styrene and 25 parts 98% allo-ocimene was cooled to 5° C. A solution of 0.75 cc. stannic chloride in 45 parts toluene was added with agitation and cooling. The temperature was increased to 45° C. The reaction mixture was allowed to stand 17 hours at 20–30° C. The viscous reaction mixture was then diluted with 70 parts of toluene. The solution was slowly added to 450 parts anhydrous 2B alcohol with moderate agitation. A viscous rubbery mass separated, which was triturated with 450 parts fresh anhydrous 2B alcohol. The material was redissolved in 350 parts benzene, and the solution then slowly added to 900 parts anhydrous 2B alcohol which was vigorously agitated with a Lightnin mixer. The finely divided precipitate was dried. There was obtained 170 parts of white powder having a drop melting point of 150° C. The product gave a somewhat flexible film when the benzene solution was poured on a glass plate, and the film then air-dried.

Example 4

One hundred parts 98% allo-ocimene and 30 parts styrene were dissolved in 600 parts ethylene dichloride. About 15 parts of boron fluoride were absorbed in the solution with vigorous agitation at 0–10° C. Agitation was continued for a period of about 3 hours at about 10° C. The reaction mixture was water-washed and the solvent evaporated by a combination of steam and vacuum distillation. A resinous copolymer was obtained in the amount of 120 parts having a color on the rosin scale of I, and a drop melting point of 120° C.

Example 5

One hundred parts 95% myrcene and 100 parts coumarone-indene fraction (60% polymerizable) were dissolved in 600 parts ethylene dichloride. About 7 parts anhydrous aluminum chloride were added during 0.5 hour at 5–10° C. with vigorous agitation. The homogeneous reaction mixture was allowed to stand for a period of 40 hours at 5° C., and was then washed with 1000 cc. aqueous 15% sulfuric acid at 60° C. and then with water. The solvent was removed as shown in Example 4. A resinous copolymer was obtained in the amount of 150 parts having a color on the rosin scale of K, and a drop melting point of 110° C.

Example 6

One hundred parts 99% allo-ocimene and 100 parts of the above coumarone-indene fraction were dissolved in 50 parts toluene. The solution was vigorously agitated with 50 parts calcined (400° C.) fuller's earth (30–40 mesh) for a period of 8 hours at 110° C. The catalyst was removed by filtration, and the toluene and unreacted constituents removed by vacuum distillation. A resinous copolymer was obtained in the amount of 110 parts having a color on the rosin scale of I, and a drop melting point of 48° C.

Example 7

One hundred parts 99% allo-ocimene and 100 parts of the above coumarone-indene fraction were dissolved in 50 parts toluene. The solution was agitated with 40 parts 85% phosphoric acid for a period of 24 hours at 20–45° C. The reaction mixture was washed with hot water to remove catalyst. The toluene and unreacted constituents were removed by vacuum distillation. A resinous copolymer was obtained in the amount of 130 parts having a color on the rosin scale of G, and a drop melting point of 150° C.

The resinous copolymers of this invention are of great commercial importance in their relation to the paint and varnish industry. The new products when incorporated in various protective coatings characteristically impart greatly improved drying properties to the resulting protective films when compared with protective coatings containing the terpene polymers of the prior art. It is to be noted, too, that the resinous copolymers of this invention are themselves more water and alkali resistant than the prior art terpene polymers. These added characteristics carry over into protective films formed from coating materials containing these copolymers. The increased water and alkali resistance resulting from the use of these new copolymers in protective coating compositions contribute in a great measure to making them highly acceptable raw materials for use in the paint and varnish industry.

The copolymer resins prepared in accordance with the invention possess generally higher viscosities or melting points, as the case may be, than the resinous polymers obtained from terpenes or terpene mixtures. Both the solid copolymers and the viscous liquids adhere well to various surfaces, as wood, glass, paper or metal. Hence, the resins are useful in the form of their clear solutions in the lacquer, varnish and adhesive fields. Unpigmented solutions or emulsions of the resins are suitable for impregnating paper, textiles, fibers, wood, etc.

The solubility characteristics of these new resins are such that they may be dissolved in common solvents, such as gasoline, benzene, toluene, ethylene dichloride, etc. They are insoluble or only slightly soluble in solvents, such as methanol, ethanol, acetone, etc.

It will be understood that wherever in this specification reference is made to the melting point of a resinous material, a melting point as determined by the Hercules drop method is contemplated.

This is a continuation-in-part of my application Serial No. 398,107, filed June 14, 1941, entitled "Terpene resins."

What I claim and desire to protect by Letters Patent is:

1. A resinous product resulting from the copolymerization of an acyclic terpene having three double bonds per molecule, and an aromatic compound having attached to the aromatic nucleus an unsaturated aliphatic substituent containing not more than five carbon atoms and an atomic grouping selected from the group consisting of vinyl and vinylene groups, at a temperature between about −60° C. and about 200° C., in presence of a catalyst capable of effecting the copolymerization of the reactants at the said temperature to form a resinous copolymer.

2. A resinous product resulting from the copolymerization of an acyclic terpene having three double bonds per molecule, and an aromatic compound having attached to the aromatic nucleus an unsaturated aliphatic substituent containing not more than five carbon atoms and a vinyl group, at a temperature between about —60° C. and about 200° C., in the presence of a catalyst capable of effecting the copolymerization of the reactants at the said temperature to form a resinous copolymer.

3. A resinous product resulting from the copolymerization of an acyclic terpene having three double bonds per molecule, and an aromatic compound having attached to the aromatic nucleus an unsaturated aliphatic substituent containing not more than three carbon atoms and a vinylene group, at a temperature between about —60° C. and about 200° C., in the presence of a catalyst capable of effecting the copolymerization of the reactants at the said temperature to form a resinous copolymer.

4. A resinous product resulting from the copolymerization of allo-ocimene and an aromatic compound having attached to the aromatic nucleus an unsaturated aliphatic substituent containing not more than five carbon atoms and a vinyl group, at a temperature between about —60° C. and about 200° C., in the presence of a catalyst capable of effecting the copolymerization of the reactants at the said temperature to form a resinous copolymer.

5. A resinous product resulting from the copolymerization of allo-ocimene and styrene, at a temperature between about —60° C. and about 200° C., in the presence of a catalyst capable of effecting the copolymerization of the reactants at the said temperature to form a resinous copolymer.

6. The process which comprises the copolymerization of an acyclic terpene having three double bonds per molecule, with an aromatic compound having attached to the aromatic nucleus an unsaturated aliphatic substituent containing not more than five carbon atoms and an atomic grouping selected from the group consisting of vinyl and vinylene groups, at a temperature between about —60° C. and about 200° C., in the presence of a catalyst capable of effecting the copolymerization of the reactants at the said temperature to form a resinous copolymer.

7. The process which comprises the copolymerization of an acyclic terpene having three double bonds per molecule, with an aromatic compound having attached to the aromatic nucleus an unsaturated aliphatic substituent containing not more than five carbon atoms and an atomic grouping selected from the group consisting of vinyl and vinylene groups, at a temperature between about —20° C. and about 80° C., in the presence of a metal halide catalyst capable of effecting the copolymerization of the reactants at the said temperature to form a resinous copolymer.

8. The process which comprises the copolymerization of an acyclic terpene having three double bonds per molecule, with an aromatic compound having attached to the aromatic nucleus an unsaturated aliphatic substituent containing not more than five carbon atoms and an atomic grouping selected from the group consisting of vinyl and vinylene groups, at a temperature between about —20° C. and about 80° C., in the presence of an acid catalyst capable of effecting the copolymerization of the reactants at the said temperature to form a resinous copolymer.

9. The process which comprises the copolymerization of an acyclic terpene having three double bonds per molecule, with an aromatic compound having attached to the aromatic nucleus an unsaturated aliphatic substituent containing not more than five carbon atoms and an atomic grouping selected from the group consisting of vinyl and vinylene groups, at a temperature between about —20° C. and about 80° C., in the presence of an activated clay catalyst capable of effecting the copolymerization of the reactants at the said temperature to form a resinous copolymer.

10. The process which comprises the copolymerization of allo-ocimene with an aromatic compound having attached to the aromatic nucleus an unsaturated aliphatic substituent containing not more than five carbon atoms and an atomic grouping selected from the group consisting of vinyl and vinylene groups, at a temperature between about —20° C. and about 80° C., in the presence of a metal halide catalyst capable of effecting the copolymerization of the reactants at the said temperature to form a resinous copolymer.

11. The process which comprises the copolymerization of allo-ocimene with an aromatic compound having attached to the aromatic nucleus an unsaturated aliphatic substituent containing not more than five carbon atoms and an atomic grouping selected from the group consisting of vinyl and vinylene groups, at a temperature between about —20° C. and about 80° C., in the presence of an acid catalyst capable of effecting the copolymerization of the reactants at the said temperature to form a resinous copolymer.

12. The process which comprises the copolymerization of allo-ocimene with an aromatic compound having attached to the aromatic nucleus an unsaturated aliphatic substitutent containing not more than five carbon atoms and an atomic grouping selected from the group consisting of vinyl and vinylene groups, at a temperature between about —20° C. and about 80° C., in the presence of an activated clay catalyst capable of effecting the copolymerization of the reactants at the said temperature to form a resinous copolymer.

13. The process which comprises the copolymerization of allo-ocimene with styrene, at a temperature between about —20° C. and about 80° C., in the presence of a metal halide catalyst capable of effecting the copolymerization of the reactants at the said temperature to form a resinous copolymer.

14. The process which comprises the copolymerization of allo-ocimene with styrene, at a temperature between about —20° C. and about 80° C., in the presence of an acid catalyst capable of effecting the copolymerization of the reactants at the said temperature to form a resinous copolymer.

15. The process which comprises the copolymerization of allo-ocimene with styrene, at a temperature between about —20° C. and about 80° C., in the presence of an activated clay catalyst capable of effecting the copolymerization of the reactants at the said temperature to form a resinous copolymer.

ALFRED L. RUMMELSBURG.